United States Patent [19]

Espin

[11] Patent Number: 5,060,879
[45] Date of Patent: Oct. 29, 1991

[54] FIXTURE FOR ATTACHING RECORDING TAPE LEADER TO A TAPE REEL

[75] Inventor: Mario W. Espin, Charlotte, N.C.
[73] Assignee: Multi-Video, Inc., Charlotte, N.C.
[21] Appl. No.: 534,135
[22] Filed: Jun. 6, 1990
[51] Int. Cl.$^5$ ............................................. B65H 75/28
[52] U.S. Cl. .................................. 242/74.1; 29/243.56
[58] Field of Search ................... 242/74.1, 74; 81/487; 29/278, 281.1, 243.56

[56] References Cited

U.S. PATENT DOCUMENTS

| | | | |
|---|---|---|---|
| 794,494 | 7/1905 | Foster | 242/74.1 |
| 1,456,007 | 5/1923 | Hartson et al. | 29/278 |
| 1,602,470 | 10/1926 | White | 242/74.1 |
| 4,019,236 | 4/1977 | Osman | 29/281.1 |
| 4,283,026 | 8/1981 | Werner | 242/74 |
| 4,387,499 | 6/1983 | Schwartz | 242/74 |

*Primary Examiner*—Daniel P. Stodola
*Assistant Examiner*—John Q. Nguyen
*Attorney, Agent, or Firm*—Shefte, Pinckney & Sawyer

[57] ABSTRACT

A fixture comprising a pair of press members for engaging opposite sides of a videotape reel for press-fitting of a retaining clip into the reel hub for re-attaching a leader portion of recording tape to the reel.

10 Claims, 2 Drawing Sheets

5,060,879

FIXTURE FOR ATTACHING RECORDING TAPE LEADER TO A TAPE REEL

BACKGROUND OF THE INVENTION

The present invention relates generally to reel-to-reel recording tape of the self-contained cartridge or cassette type, e.g., videotape cassettes, and, more particularly, to a fixture by which a leader portion at one end of a recording tape may be reliably and conveniently attached to a tape reel from such a cassette or cartridge.

In conventional videotape cassettes, a pair of tape reels are rotatably supported within a cartridge-like housing with each opposite end of a length of audiovisual recording tape being attached to a hub portion of a respective one of the reels. In this manner, the tape can be windingly transferred between the two reels for playing of or recording on the tape when traveling in one direction between the reels utilizing a compatible recording or playback machine and for selective rewinding of the tape in the opposite direction. Typically, the hub of each tape reel is provided with a peripheral slot which fittedly receives a retaining element or clip to grippingly engage a leader portion at one end of the recording tape, whereby the tape may be securely attached to the reel but also can be selectively detached from the reel if necessary. While this clip-type means of attaching a tape leader portion to a tape reel functions acceptably for its intended purpose, it is difficult to reinstall the retaining element or clip if removed, such as for purposes of performing repairs on a cassette or when splicing or shortening the length of recording tape stored on the reels in the cassette.

SUMMARY OF THE INVENTION

It is accordingly an object of the present invention to provide a simple and inexpensive yet convenient and reliable fixture by which the retaining element of the hub of a tape reel may be readily installed in the compatible peripheral slot of the hub for attaching a leader portion of recording tape to the reel.

Briefly summarized, the fixture of the present invention comprises a pair of press members configured for selective movement toward and away from one another into and out of cooperative simultaneous engagement with opposite sides of the hub of a tape reel to actuate press fitting of the retaining element of the hub into the peripheral slot of the hub, thereby grippingly engaging the leader portion of tape between the retaining element and the hub.

In the preferred embodiment, each press member includes a hub engaging surface of a generally semi-circular configuration conforming to the periphery of the hub. Each press member preferably includes a plurality of the hub engaging surfaces of differing sizes to accommodate hubs of correspondingly differing diameters. It is further preferred that one press member be equipped with suitable means for releasably holding the retaining element in position for press fitting into the peripheral slot of the hub when the two press members are moved together. One press member may be provided with a base portion for standing disposition of the press member on a support surface. It is further preferred that one press member have a surface for supporting a companion reel to which the opposite end of the recording tape is attached.

DESCRIPTION OF THE PREFERRED EMBODIMENT

Figure 1:
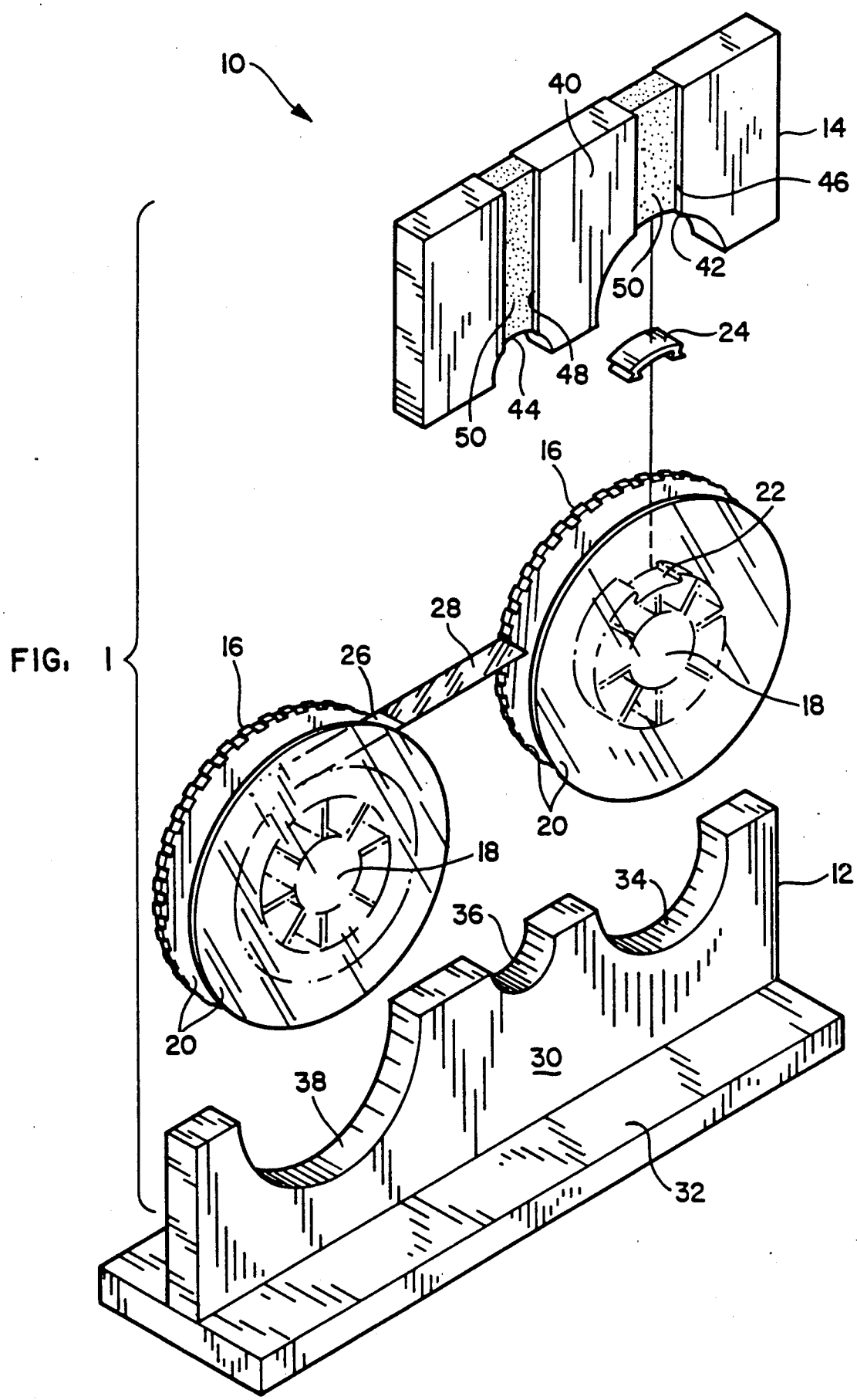
FIG. 1 is an exploded view of a fixture according to the preferred embodiment of the present invention, including a pair of tape reels from a conventional videotape cassette.
Figure 2:
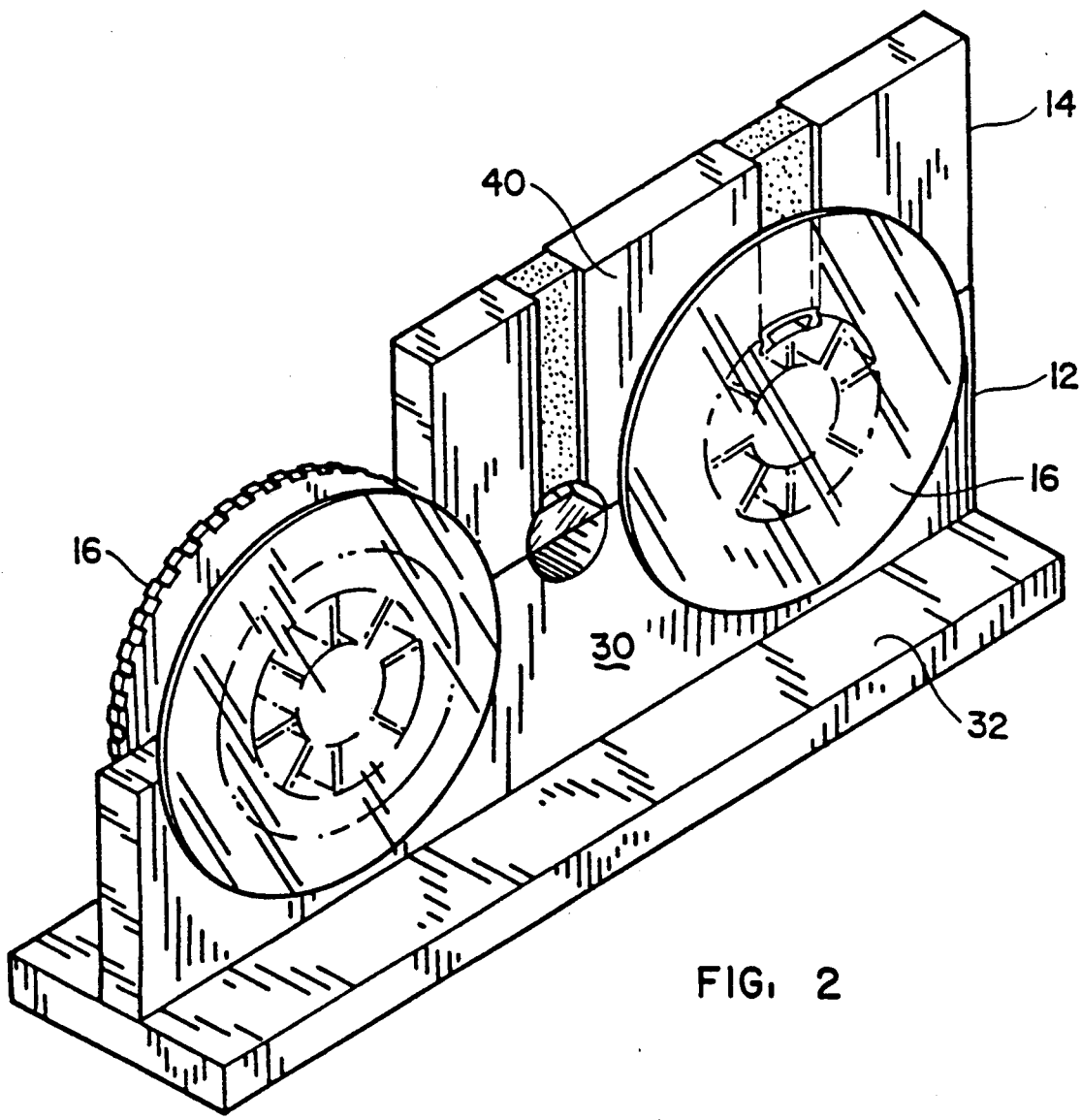
FIG. 2 is a corresponding perspective view of the fixture of FIG. 1 in operation on one of the tape reels.

Referring now to the accompanying drawings, and initially to FIG. 1, the fixture of the present invention is indicated in its entirety at 10 and basically includes a pair of press members 12, 14. The fixture 10 is adapted for operation on the tape reels 16 of a conventional videotape cassette (not shown).

Basically, as above-described, a videotape cassette houses two tape reels 16, each of which has a central axial hub portion 18 and a pair of circular side flanges 20 extending radially outwardly at each end of the hub 18. The hub 18 is of a cylindrical configuration with a recess 22 formed in its outer periphery over a relatively short arcuate extent thereof, e.g., approximately 45° to 60°, between the flanges 20. A retaining element 24 of a corresponding arcuate configuration and dimension is provided for snap-fitted receipt in the hub recess 22. Each opposite end 28 of a length of recording tape 26 is attached to the hub 18 of a respective one of the reels 16 by capturing and grippingly engaging the tape end 28 in the hub recess 22 between the retaining element 24 and the body of the hub 18 when the retaining element 24 is snap-fitted into the recess 22.

Typically, each end portion 28 of recording tape 26 is a length of so-called leader tape, normally of a sturdier clear plastic tape material than the actual recording tape 26. The leader portion of tape serves the dual purpose of providing sturdy ends to the tape 26 by which it can be attached securely to the respective reels 16 while also providing a differentiable end portion to the tape for actuation of appropriate sensors contained in conventional videotape cassette playback and recording equipment for stopping the playback, recording and rewinding modes of the equipment when an end of the tape within a cassette is reached.

The press members 12, 14 of the present fixture 10 facilitate the snap-fitting of the retaining element 24 into the recess 22. The press member 12 has a planar main body 30 with a base portion 32 along a lower edge thereof for free-standing disposition of the press member 12 on substantially any suitable horizontal work surface, e.g., a table top, with the main body 30 in an upright orientation. The main body 30 of the press member 12 is of a thickness slightly less than the spacing between the flanges 20 of reels 16 in a conventional videotape cassette. The upper edge of the main body 30 is formed with three semi-circular recesses 34, 36, 38 spaced along its length, each of a differing diametric dimension.

As is known, videotape cassette reels may be equipped with hubs 18 of differing diameters, depending upon the length of tape attached to the reels. For example, the length of recording tape contained in a standard two-hour videotape cassette would be approximately twice as long as the tape contained in a standard one-hour videotape cassette. In turn, the diameter of the hubs 18 of the reels 16 in a two-hour cassette would necessarily be of a substantially smaller diameter than the hubs 18 of the reels 16 in a one-hour cassette in order to accommodate the greater length of tape.

Since standard one-hour and two-hour cassettes comprise the largest proportion of blank recording tapes currently marketed, and since most pre-recorded videotape cassettes, e.g., containing pre-recorded movies and the like, are generally of an approximately two-hour length, the radial dimension of the recess 34 is approximately the same as or slightly greater than the radial dimension of the hubs 18 of reels 16 in a standard one-hour videotape cassette and, similarly, the radial dimension of the recess 36 is approximately the same as or slightly greater than the radial dimensions of the hubs 18 of reels 16 in a standard two-hour videotape cassette. The recess 38, on the other hand, is of a radial dimension approximately the same as or slightly greater than the effective radial dimension of a standard reel 16, regardless of hub size, wound with a full capacity of recording tape.

Accordingly, an empty reel 16 from a standard one-hour videotape cassette may be supported on the main body 30 at the recess 34 with its relatively large diameter hub 18 resting on the semi-circular surface of the main body 30 bordering the recess 34 and with the flanges 20 outwardly flanking the opposite side faces of the main body 30. Similarly, an empty reel 16 from a standard two-hour videotape cassette or from a pre-recorded cassette of a similar tape length and running time may be supported in like manner in the recess 36. In either case, the other reel 16 from the same videotape cassette, which necessarily would contain the full length of recording tape from the cassette, may be supported in the same manner in the recess 38.

The press member 14 is of a similar construction to the press member 12, having a main body 40 of a thickness slightly less than the spacing between the flanges 20 of a standard videotape cassette reel 16 and having semi-circular recesses 42, 44 formed in a lower edge of the main body 40 in respectively corresponding radial dimensions and at corresponding spacings as the recesses 34, 36 of the press member 12. The press member 14, however, is not provided with any base portion or with any recess for accommodating a full-capacity reel. In addition, the opposite side faces of the press member 14 are formed with a recessed slot 46 extending from the recess 42 to the opposite lengthwise edge of the main body 40 and with a similar recessed slot 48 extending from the recess 44 to the opposite lengthwise edge of the main body 40. A length of double-sided adhesive tape 50 is affixed to the main body 40 within each slot 46, 48 to releasably hold a retaining element 24 within the respective recess 42, 44 during operation of the fixture 10 as below-described.

As those persons skilled in the art will recognize, a leader end portion 28 of recording tape 26 in a videotape cassette may become detached from its respective reel hub 18 as a result of a malfunction of the cassette or playback/recording equipment or the leader end portion 28 may be detached from its respective hub 18 for purposes of carrying out a repair procedure. In either case, it is, of course, necessary to reattach the leader portion 28 to its respective hub 18 before the videotape cassette can be returned to service. To do so utilizing the present fixture, the videotape cassette housing is disassembled (if not done already) and the recording tape 26 is fully wound onto the reel 16 to which the tape remains attached, thereby exposing the opposite leader end portion 28 unattached and separated from the other reel 16 which, in turn, remains empty. If necessary, the retaining element 24 is detached from the hub 18 of the empty reel.

Then, the empty reel 16 is placed on the main body 30 in the appropriate recess 34 or 36, as above-described, and the tape-containing reel 16 is placed on the main body 30 in the recess 38. The empty reel 16 is positioned with its hub recess 22 facing upwardly and the terminal end of the exposed leader tape portion 28 from the tape-containing reel 16 is inserted between the flanges 20 of the empty reel 16 and placed onto its hub 18 in overlying relation to the upwardly facing recess 22 and extending slightly therebeyond, e.g., approximately one-fourth to one-half of an inch. The outer peripheral arcuate surface of the retaining element 24 is placed in adhering contact to the adhesive tape 50 in the appropriate recess 42, 44 of the press member 14 in corresponding orientation to the upwardly facing recess 22 of the empty reel 16 on the press member 12.

The press member 14 is then manually gripped and brought into overlying mirror-image relation to the press member 12, thereby inserting the main body 40 of the press member 14 between the flanges 20 of the empty reel 16 supported on the press member 12 and, in turn, positioning the retaining element 24 in contact with the leader portion 28 directly overlying the upwardly facing hub recess 22 of the empty reel 16. With the press member 14 so positioned, manual force is exerted downwardly on the press member 14 to press-fit the retaining element 24 into the recess 22 of the empty reel 16, thereby securely capturing the leader portion 28 therebetween. With the leader tape portion 28 reattached to the empty reel 16, both reels 16 may then be returned to the cassette housing for reassembly.

As will thereby readily be recognized by those persons skilled in the art, the fixture 10 of the present invention greatly facilitates the repair and reassembly of videotape cassettes. No comparable tool or fixture is known to exist available to the general public, the retail videotape cassette trade, or the videotape cassette and equipment repair industry. Thus, the only way presently to reattach a tape leader portion to a videotape cassette reel is to attempt to press the retaining clip back into its mating hub recess utilizing a screwdriver, pliers or other conventional tool which necessarily is not intended and is ill-equipped for performing this operation. In contrast, the present invention is simple and reliable to use and is relatively inexpensive to manufacture. Accordingly, videotape cassettes which otherwise might be discarded as non-repairable because of a detached leader tape portion can now be easily restored to good working order.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A fixture for attaching a leader portion at one end of a recording tape to a tape reel of the type having a central hub for annular winding of tape thereabout, the hub defining a peripheral slot for fitted receipt therein of a retaining element for gripping engagement of the leader portion of tape, said fixture comprising a pair of press members configured for selective movement toward and away from one another into and out of cooperative simultaneous engagement with opposite sides of the hub of the tape reel for actuating press fitting of the retaining element into the peripheral slot of the hub, one said press member comprising a surface for supporting a companion reel to which the opposite end of the recording tape is attached.

2. A fixture according to claim 1 and characterized further in that each said press member includes a hub engaging surface configured in conformity to the periphery of the hub.

3. A fixture according to claim 2 and characterized further in that said hub engaging surface of each said press member is generally semi-circular.

4. A fixture according to claim 2 and characterized further in that each said press member includes a plurality of said hub engaging surfaces of differing sizes for accommodating hubs of correspondingly differing sizes.

5. A fixture according to claim 1 and characterized further in that one said press member includes means for releasably holding the retaining element in position for press fitting into the peripheral slot of the hub when the pair of press members are moved into engagement with the hub.

6. A fixture according to claim 1 and characterized further in that one said press member comprises a base portion for standing disposition on a support surface.

7. A fixture for attaching a leader portion at one end of a recording tape to a tape reel of the type having a central hub for annular winding of tape thereabout, the hub defining a peripheral slot for fitted receipt therein of a retaining element for gripping engagement of the leader portion of tape, said fixture comprising a pair of press members configured for selective movement toward and away from one another into and out of cooperative simultaneous engagement with opposite sides of the hub of the tape reel for actuating press fitting of the retaining element into the peripheral slot of the hub, each said press member including a plurality of hub engaging surfaces of differing sizes for accommodating hubs of correspondingly differing sizes, each hub engaging surface being configured in conformity to the periphery of a corresponding size hub.

8. A fixture according to claim 7 and characterized further in that said hub engaging surface of each said press member is generally semi-circular.

9. A fixture according to claim 7 and characterized further in that one said press member includes means for releasably holding the retaining element in position for press fitting into the peripheral slot of the hub when the pair of press members are moved into engagement with the hub.

10. A fixture according to claim 7 and characterized further in that one said press member comprises a base portion for standing disposition on a support surface.

* * * * *